Jan. 25, 1966 K. W. CRAFT 3,231,828

TUNABLE CRYSTAL OSCILLATOR SPECTRUM SOURCE FOR MICROWAVE AFC SYSTEM

Filed March 22, 1963 3 Sheets-Sheet 1

INVENTOR.

KINGSLEY W. CRAFT

BY

Philip J McFarland

ATTORNEY

INVENTOR.
KINGSLEY W. CRAFT
BY
ATTORNEY

Jan. 25, 1966 K. W. CRAFT 3,231,828

TUNABLE CRYSTAL OSCILLATOR SPECTRUM SOURCE FOR MICROWAVE AFC SYSTEM

Filed March 22, 1963 3 Sheets-Sheet 3

INVENTOR.
KINGSLEY W. CRAFT

BY

Philip J. McFarland
ATTORNEY

United States Patent Office 3,231,828

Patented Jan. 25, 1966

3,231,828

TUNABLE CRYSTAL OSCILLATOR SPECTRUM SOURCE FOR MICROWAVE AFC SYSTEM

Kingsley W. Craft, Needham, Mass., assignor to Laboratory for Electronics, Inc., Boston, Mass., a corporation of Delaware Filed Mar. 22, 1963, Ser. No. 267,253
4 Claims. (Cl. 331—19)

This invention pertains generally to microwave instruments and particularly to a phase-locked broad-band crystal-reference oscillator adapted to use in the microwave portion of the frequency spectrum.

There are many known types of phase-locked crystal-reference oscillators which may be used to determine or to control the frequency of operation of a microwave oscillator, as a klystron. For example, in one lately developed model of such an oscillator, a crystal oscillator (which produces a signal at a relatively low frequency) is connected to a multiplier chain to produce a spectrum of signals throughout a predetermined microwave band. Such a spectrum then is heterodyned with the signal output of the microwave oscillator whose frequency is to be measured or controlled to produce a beat frequency signal the phase of which is a function of the initial difference between the frequency of the microwave oscillator and the frequency of a selected one of the spectrum of signals, Such a beat frequency signal is then compared with the signal output of a reference oscillator to produce an error signal which, upon application to the microwave oscillator, causes the frequency of the output signal of the microwave oscillator to change until the beat frequency signal is phase-locked with the signal output of the reference oscillator. Thus, the frequency of the microwave oscillator may be determined, after phase-locking is accomplished, by determining the frequency of the particular signal with which the output signal of the microwave oscillator is heterodyned. While the just-mentioned device has many applications, the fact that it is operative only at fixed frequencies within a spectrum detracts a great deal from its usefulness. When the difference between each side band in the spectrum of frequencies is made smaller than, say 100 megacycles, it is very difficult to isolate individual side bands to obtain any great degree of stability in operation.

Therefore it is a primary object of this invention to provide an improved phase-locked broad-band crystal-reference oscillator which is adapted to continuously tuning a microwave oscillator over a band of frequencies.

Still another object of the invention is to provide an improved phase-locked broad-band crystal-reference oscillator which maintains its stability within very close limits for long periods of time.

These and other objects of this invention are attained generally by providing a spectrum of signals in a microwave band of frequencies, the frequency separation of successive signals in such a spectrum being equal to the frequency of the signal output of a relatively low frequency crystal-controlled oscillator; pulling the output frequency of such oscillator as desired, to vary the frequency of each signal in the spectrum, thereby permitting continuous tuning through a microwave band of interest, the amount of pulling being restricted so as not to degrade the stability of the crystal-controlled oscillator; selecting a single one of the signals in the spectrum of signals in the microwave band by means of a narrow band variable filter; comparing the so-selected signal with a portion of the signal output of the microwave oscillator whose frequency is to be measured or controlled to generate an error signal; and varying the frequency of the signal output of the microwave oscillator in accordance with the error signal until the error signal is a minimum and there is a predetermined fixed difference in frequency between the frequency of the signal output of the microwave oscillator and the frequency of the selected signal in the spectrum of signals.

For a more complete understanding of the invention, reference is now made to the detailed description of a preferred embodiment thereof and to the accompanying drawings, in which.

Figure 1:
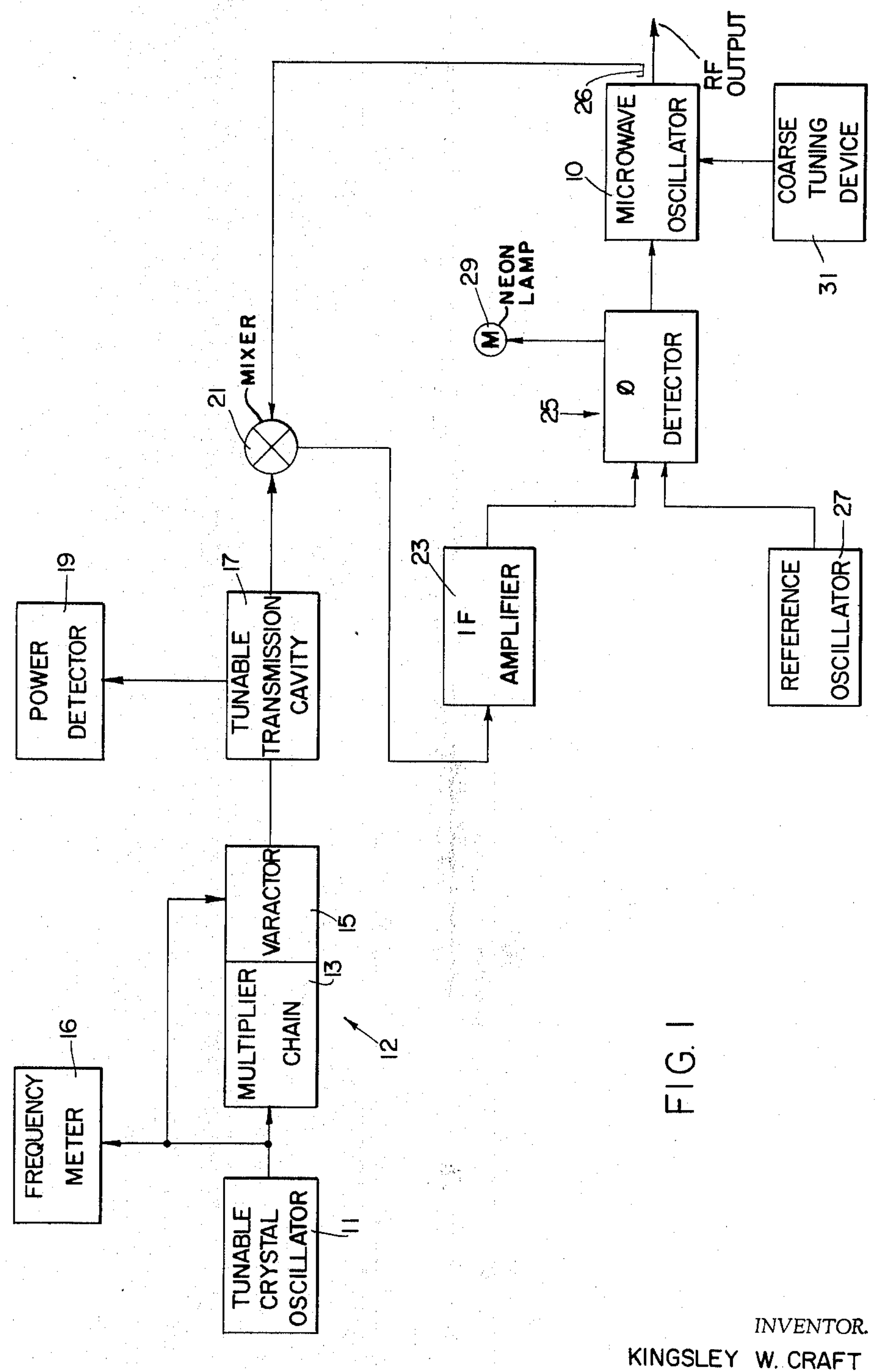
FIG. 1 is a block diagram of a complete system for controlling the frequency of the output signal of a microwave oscillator, the system incorporating a phase-locked broad-band crystal-controlled oscillator according to the invention.

Referring now to FIG. 1, it may be seen that the contemplated system comprises generally means for generating a plurality of microwave signals, varying the frequency of each of such signals, selecting a desired one of such signals and locking the frequency of a microwave oscillator 10 with such selected signal. Thus, a tunable crystal oscillator 11 (meaning a crystal-controlled oscillator which is loaded with a variable load impedance so that the crystal may be caused to oscillate at slightly differing frequencies depending on the load on the crystal) is fed through a frequency multiplier 12 (here consisting of a multiplier chain 13 and a varactor 15) and is also connected directly to the varactor 15. Thus, the output signal of the frequency multiplier 12 is a spectrum of signals, successive ones of such signals being separated in frequency by an amount equal to the frequency of the tunable crystal oscillator 11. The center frequency of such a spectrum is equal to the product of the overall multiplication factor of the frequency multiplier 12 and the frequency of the signal out of the tunable crystal oscillator 11. Therefore, if the crystal in the tunable crystal oscillator 11 is cut to have a natural frequency of 8 mc. and the frequency multiplier 12 is designed to have a multiplication factor of 1080, then the center frequency of the output signal of the frequency multiplier 12 would be 8640 mc. and the frequency of the sidebands in the spectrum would be $[8640\pm 8n]$ mc., where "$n$" is the number of each such sideband. If however, the frequency of the tunable crystal oscillator is pulled (as by changing its loading) less than 0.1%, say ±6 kc., then the center frequency of the spectrum would be $[8640\pm 1080\times .006]$ mc. and the frequency of each sideband would shift accordingly. A change of such order from the natural frequency of an 8 mc. crystal does not affect its stability in any appreciable way.

The spectrum of signals out of the frequency multiplier 12 is impressed on a tunable transmission cavity 17. This latter element may be of conventional construction, the only practical restriction on its construction being that its "Q" be high enough so that signals of all frequencies except the desired one are effectively rejected. A power detector 19, again of conventional construction, is coupled in any convenient way to the tunable transmission cavity 17. It is evident, therefore, that when the indication on the power detector 19 is at a maximum, the tunable transmission cavity 17 is tuned to a single one of the sidebands in the spectrum of frequencies impressed thereon. The actual frequency to which the tunable transmission cavity 17 is responsive may, of course, be determined by calibrating its means (not shown) for tuning. It should be noted here, however, that the means for tuning the tunable transmission cavity 17 preferably should be calibrated to indicate the frequency of the microwave signal out of the microwave oscillator 10.

The signal selected by the tunable transmission cavity 17 is impressed on a conventional microwave mixer 21 and heterodyned therein with a portion of the output signal of the microwave oscillator 10, which portion may be derived in any convenient manner, as by a probe 26. The output of the microwave mixer 21 is amplified in a conventional IF amplifier 23 turned to any convenient frequency, say 30 mc., and then applied to one of the input terminals of a phase detector 25 (to be described in detail hereinafter). The output of a reference oscillator 27 is connected to a second input terminal of the phase detector 25. The output of the phase detecor 25 is a D.C. error voltage (the polarity and magnitude of which is dependent upon the phase difference between the input signals thereto) and a D.C. sense voltage (the polarity of which is dependent upon the relative frequencies of the signals fed into the microwave mixer 21). The D.C. sense voltage is led to an indicator 29, as a neon lamp, to provide a signal when the signals fed into the microwave mixer 21 bear a predetermined frequency relationship to each other. The D.C. error voltage is connected to an appropriate electrode, as the repeller electrode if a klystron is used, of the microwave oscillator 10, thus changing the frequency of the output signal therefrom. Obviously then, when conditions in the loop comprising the probe 26, the microwave mixer 21, the IF amplifier 23 and the phase detector 25 are such that the error voltage is zero, the output signal of the IF amplifier 23 will be locked to the output signal of the reference oscillator 27 and the frequency of the output signal of the microwave oscillator 10 will produce a fixed predetermined difference frequency (here 30 mc.) when heterodyned with the selected signal in the spectrum of signals impressed on the tunable transmission cavity 17. The foregoing servo loop control of the frequency of the output of the microwave oscillator 10 is, of course, operative only after a coarse tuning device 31 has been adjusted so as to bring the frequency of the output signal within range of operation of such a servo loop. The coarse tuning device 31 may take any one of many forms. For example, the coarse tuning device 31 could be a mechanical arrangement for changing the dimensions of the klystron cavity or could be a frequency sweep voltage applied to the repeller electrode and responsive to the error voltage out of the phase detector 25.

In operation, the desired frequency of the output signal of the microwave oscillator 10 is determined and the tunable transmission cavity 17 is set to resonate at a frequency removed from such desired frequency by an amount equal to the center frequency of the IF amplifier 23. The output of the tunable crystal oscillator 11 is then pulled until the power detector 19 indicates a maximum. It is known, therefore, that the signal output of the tunable transmission cavity 17 is at a frequency desired of the microwave oscillator, plus or minus an amount equal to the IF frequency.

The frequency of the output of the microwave oscillator 10 is set roughly by the coarse tuning device 31 and then sampled by the probe 26. Such sampled signal is beaten against the signal out of the tunable transmission cavity 17 to produce a signal at the IF frequency. It should be again noted here that, because of the selectivity of the tunable transmission cavity 17, all other beat frequencies are effecively suppressed. The output of the IF amplifier 23 is then compared, in the phase detector 25, with the output of the reference oscillator 27 (which output is also at the IF frequency) to produce an error signal having an amplitude and polarity indicative of the difference in phase between the IF signal and the signal output of the reference oscillator 27. Such error signal is then applied to the microwave oscillator 10 to change the output frequency thereof to its desired value i.e the frequency required to produce an IF signal of the same phase as the phase of the signal output of the reference oscillator 27. At the same time, the indicator 29 produces a signal showing the frequency of the signal output of the tunable transmission cavity 17 is higher or lower than the frequency of the signal output of the microwave oscillator 10.

The exact frequency at which the tunable transmission cavity 17 is resonant may be calculated by determining the multiplication factor of the frequency multiplier 12 and multiplying the frequency indicated by the frequency meter 16 by such factor. The multiplication factor of the frequency multiplier 12 may be determined by dividing the frequency which the reading on the calibrated tuning means indicates to be the resonant frequency of the tunable transmission cavity 17 (adding or subtracting the IF frequency if the tuning means is calibrated in terms of frequency of the microwave oscillator 10) by the frequency indicated by frequency meter 16 and rounding off the number so obtained to the nearest integer. The frequency at which the tunable transmission cavity 17 is tuned (and therefore the actual frequency of the microwave oscillator 10) may then be calculated very precisely by multiplying the frequency indicated on the frequency meter 16 by the multiplication factor so obtained.

Figure 2:
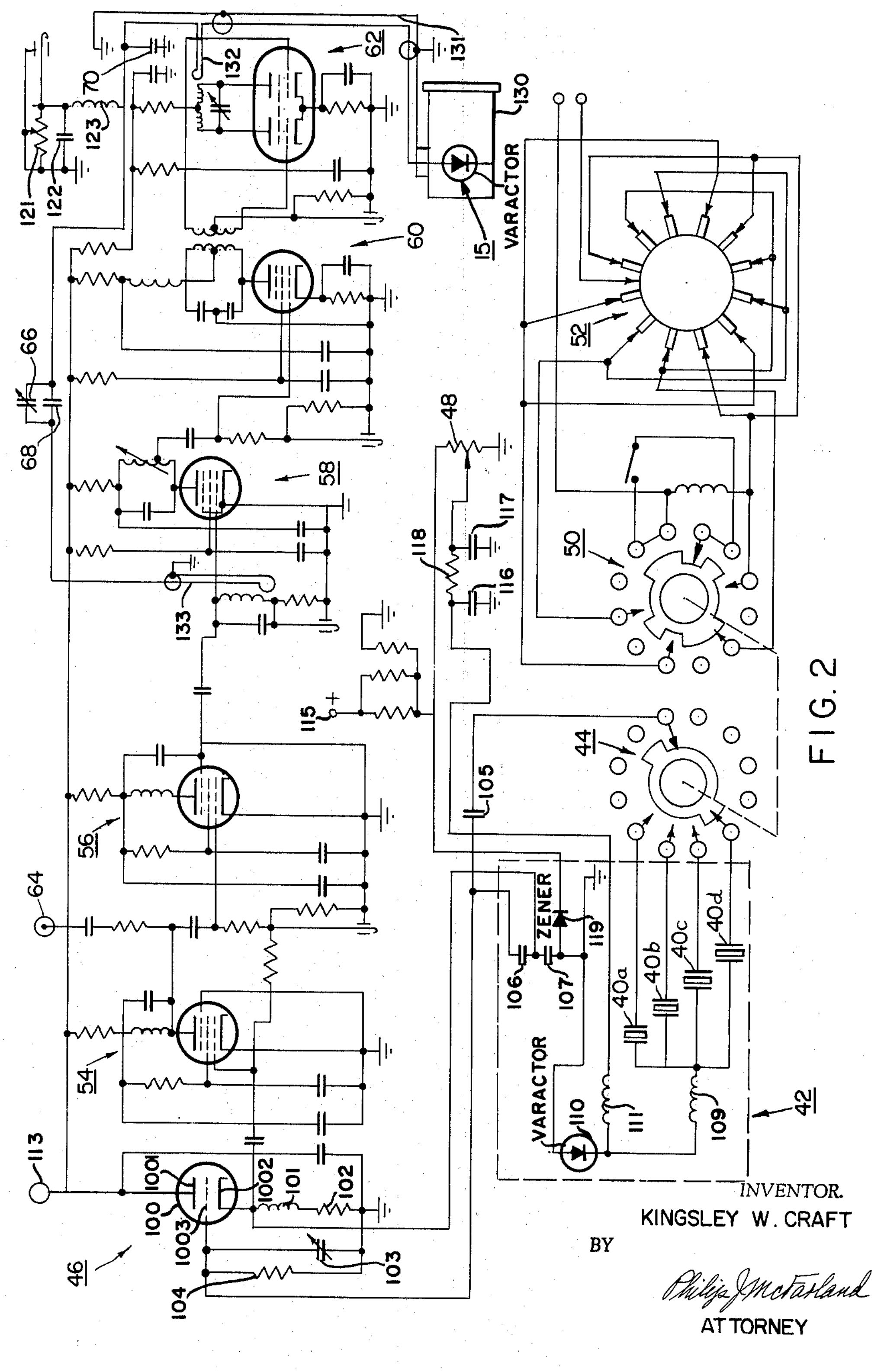
FIG. 2 is a simplified schematic drawing of portions of the system shown in FIG. 1.

Referring now to FIG. 2 a preferred embodiment of the tunable crystal oscillator 11, the multiplier chain 13 and the varactor 15 of FIG. 1 is illustrated. Thus, in FIG. 2 the tunable crystal oscillator 11 consists of a plurality of piezo-electric crystals 40*a*, 40*b*, 40*c*, 40*d* mounted in a temperature-controlled oven 42, each such crystal being connected through a selector switch 44 in circuit with an electron discharge device and associated circuit components (not numbered) which make up an oscillator stage 46. As shown, the selector switch 44 is actuated by a follower 50 of a remote switching device 52. It will be obvious, however, that the last two named elements are not essential to the invention but are used for convenience only. The piezo-electric crystals 40*a*, 40*b*, 40*c*, 40*d* are cut for slightly different frequencies, as 8018, 8012, 8006 and 8000 kilocycles, respectively. The actual frequency of the output signal of the oscillator stage is, therefore, determined by selecting a particular one of the piezo-electric crystals 40*a*, 40*b*, 40*c*, 40*d* and setting the variable resistor 48 to "pull" the selected crystal. As noted hereinbefore, if the amount of "pulling" is limited to something less than 0.1% of the natural frequency of the piezo-electric crystals, then the stability of the oscillator stage will suffer no appreciable degradation. In the illustrated case, therefore, if pulling due to change in loading is limited to approximately 4 kilocycles, the oscillator stage may be adjusted to produce any frequency between 8018 and 8000 kilocycles.

More specifically, the oscillator stage 46 is formed with a triode electron discharge device or tube 100 arranged in a Colpitts configuration. In this configuration, anode 1001 is connected to a source of positive potential by way of a terminal 113, and cathode 1002 is connected to a common point or ground through an inductor 101 and a cathode biasing resistor 102 in series with one another. The function of inductor 101 is to provide a high cathode circuit impedance independent of the biasing action of resistor 102. Coupled to the grid 1003 of triode 100 by means of a coupling capacitor 105 and grid resistor 104 is a parallel resonant circuit which governs the frequency of oscillation. As shown, this circuit comprises capacitors 106, 107 in one branch, and in the other, the series combination of a varactor 110, inductor 109 and a selected one of the crystals 40*a*–40*d* as determined by the setting of switch 44. Inductor 109 serves to lower the effective Q of the resonance circuit so that the oscillator frequency may be varied throughout an appreciable range. The feedback path between the cathode and grid circuits of electron tube 100, which establishes conditions for oscillation, is between the junction of capacitors 106, 107 and the cathode 1002.

To vary the frequency of oscillation, a controlled voltage determined by the setting of a potentiometer 48 is applied to the varactor thereby to vary its effective capacitance and hence the tuning of the resonant circuit. This voltage is derived from a regulated source of direct voltage supplied between a terminal 115 and ground. Potentiometer 48 is effectively connected across this source and the variable voltage output therefrom is applied to the varactor through a ripple filter comprising capacitors 116, 117 and a resistor 118. There is also an inductor 111 connected between varactor 110 and capacitor 116 to isolate this voltage control circuit from the radio frequency output of the oscillator, and a zener diode 119 connected across the potentiometer to stabilize the direct voltage from which the variable voltage output is derived. Finally, a trimmer capacitor 103 is provided between grid 1003 and ground for independent adjustment of the frequency range through which the oscillator may be varied by means of the potentiometer 48.

The frequency multiplier 12 comprises a conventional buffer amplifier 54 and cascaded multiplying stages 56, 58, 60, 62, which multiply the frequency of the output of the oscillator stage by, respectively, factors of 3, 2, 3 and 3. The output of the buffer amplifier 54 is also led, through an appropriate resistor-capacitor combination to a terminal 64 (to which the frequency meter 16 of FIG. 1 may be connected). A capacitive voltage divider consisting of capacitors 66, 68, 70 is inductively coupled to the frequency multiplier 12 to pick up a portion of the output of multiplying stage 56 and mix such signal with the output signal of multiplying stage 62. It will be noted here that there is a difference between FIG. 1 and FIG. 2 in respect to the just-mentioned portion of the circuit. It has been found however that satisfactory results may be more easily obtained if the frequency of successive sidebands in the finally to be derived spectrum of signals in the X band are separated by an amount approximately equal to three times the natural frequency of the piezoelectric crystals *40a, 40b, 40c, 40d.* That is, in the present case, a separation of approximately 24 mc. is quite adequate. Such a larger separation of the signals in the spectrum of frequencies at X band in turn permits a lower "Q" for the tunable transmission cavity 17. The output frequency ($f_0$) from the multiplier chain 13 gives rise to a spectrum of frequencies which may be expressed as:

$$(f_0 = n_1 f_1 \pm n(n_2 f_1)$$

where $f_1$=the frequency of the tunable crystal oscillator 11;
$n_1$=the multiplying factor of the multiplier chain 13;
$n_2$=the multiplying factor of the portion of the multiplier chain 13 to which the capacitive voltage divider is coupled; (first stage designated 56 in the drawing) and,
$n$=the sideband number The varactor 15 itself may be a type MA460D manufactured by Microwave Associates, Inc., of Burlington, Massachusetts. It is mounted in a waveguide 130 with one of its ends grounded to the guide and its other end connected to the center conductor of a coaxial cable. The outer conductor of the cable is of course also grounded. Coupling from the final multiplier stage 62 to the cable is afforded by a pick up loop 132 positioned adjacent to the tank circuit for this stage and coupling to stage 56 is afforded by a pick up loop 133 adjacent to its tank circuit. The aforementioned capacitive voltage divider comprising capacitors 66, 68 and 70 is connected in circuit between the loop 133 and the cable 131.

Varactor 15 is self-biasing and to control the value of the bias voltage, there is a variable resistance 121 connected in series with an inductor 123 between one side of capacitor 70 (which is connected to the center conductor of cable 131) and ground. Inductor 123 serves to impede the passage of R.F. to ground through the resistor 121 and through a capacitor 122 which serves as an R.F. bypass for the resistor.

In operation, the nonlinear impedance exhibited by the varactor 15 distorts the waveform of the output signal from the final multiplier stage, and this distortion in effect gives rise to harmonics extending over a broad range of microwave frequencies. Wave signals at these harmonic frequencies together with the fundamental are launched by the varactor directly into the wave guide. At the same time, phase modulation of the fundamental and the harmonics is caused to take place by virtue of the mixing action of the varactor. This phase modulation at the frequency of the output signal derived from multiplier stage 56 gives rise to a family of sideband frequencies associated with each wave signal. The frequency separation of these sidebands corresponds to the modulating frequency, in accordance with classical modulation theory.

Thus the spectrum of signals out of the varactor 15 is set by the frequency of oscillation of the tunable crystal oscillator 11, the sidebands of the signal passing through the multiplier chain 13 and the varactor 15 and the sidebands produced by the signal sampled at multiplier stage 56 in the multiplier chain 13 and passed directly to the varactor 15.

Figure 3:
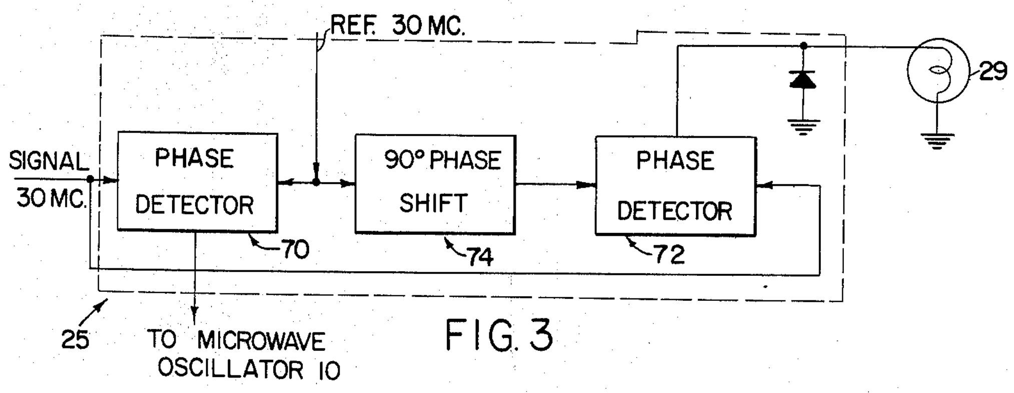
FIG. 3 is a more detailed block diagram of the phase detector shown in FIG. 1; and, FIG. 4 is a simplified schematic diagram of the phase detector shown in block form in FIG. 3.
Figure 4:
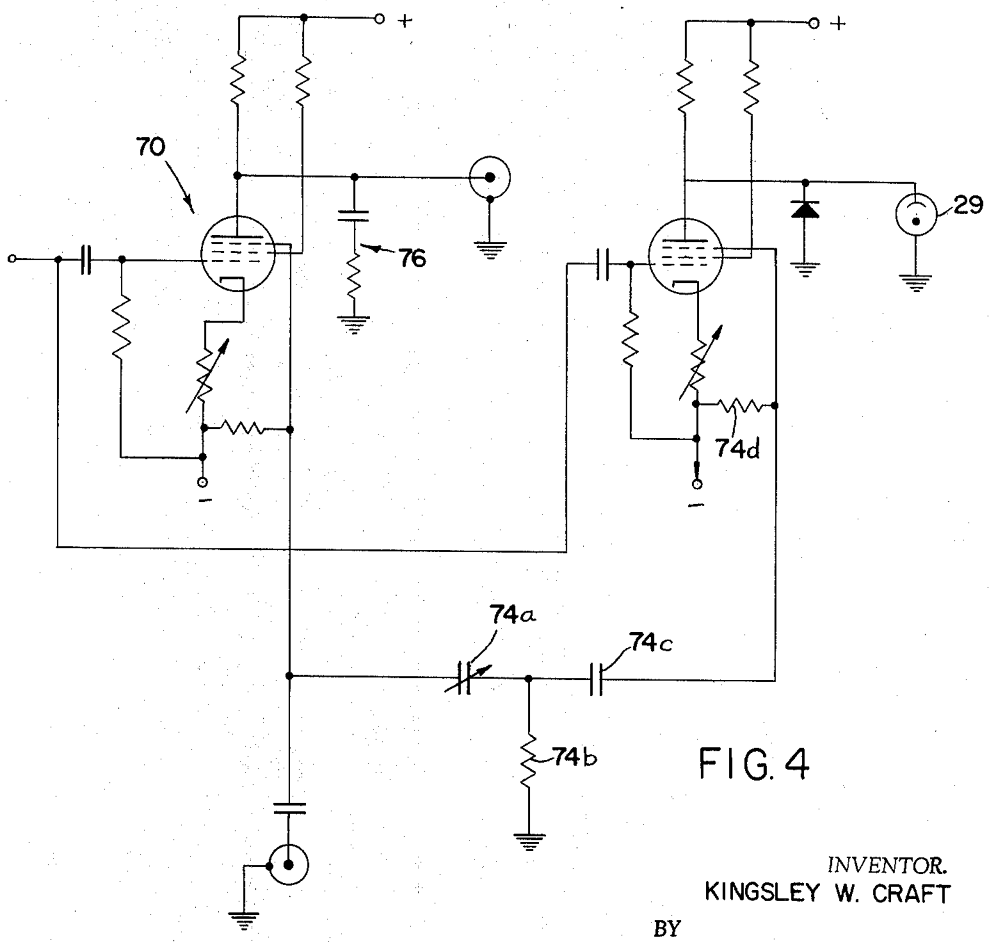

Referring now to FIGS. 3 and 4, it may be seen that there are two phase detecting circuits 70, 72 embodied in a preferred form of the phase detector 25. The phase detecting circuit 70 is arranged to compare the output signal of the IF amplifier 23 and the output signal of the reference oscillator 27. In the illustrated case, the frequency of the output signal of the reference oscillator is, of course, 30 mc. The phase detecting circuit 70, as is clear from FIG. 4, may consist of a gated beam electron discharge device (as a 6BN6), associated biasing resistors and an integrator 76. Consequently, when a portion of the signal output of the IF amplifier 23 is impressed on grid #1 of such a tube and a portion of the signal output of the reference oscillator 27 is impressed on grid #3 (which latter portion has sufficient amplitude to cut off the electron discharge device for approximately one half of each of its cycles), the D.C. output of the integrator 76 will vary in accordance with the phase of the signal on grid #1 with respect to the phase of the signal on grid #3. When the two signals are 90° out of phase with each other, the amplitude of the D.C. output of the integrator 76 will have a fixed value dependent upon the voltages of the power supplies used to energize the electron discharge device and the value of the various biasing resistors. When the two signals are in phase with each other, the amplitude of the D.C. output of the integrator 76 will be greater and when the two signals are 180° out of phase, the amplitude of the D.C. output of the integrator 76 will be less. It will be recognized, therefore, that the frequency of the microwave oscillator 10 may be changed by applying the D.C. output of the integrator 76 to an appropriate electrode in the microwave oscillator 10 to change the output frequency thereof until, finally, the signals impressed on the control grids of the electron discharge device of the phase detecting device are exactly 90° out of phase with each other.

The phase detecting circuit 72 is substantially the same as the phase detecting circuit 70. The phase of the input signal to grid #3 of the electron discharge device of phase detecting circuit 72 is, however, shifted by about 90° with respect to the phase of the signal impressed on grid #3 of the electron discharge device of phase detecting circuit 70. Such a shift may be conveniently accomplished by a capacitor-resistor network *74a, 74b, 74c, 74d.* Thus, when the D.C. output of the integrator 76 indicates that the signal outputs of the reference oscillator 27 and the IF amplifier 23 are actually 90° out of phase with each other, the output signal of the electron discharge device of the phase detecting circuit 72 indicates that the signal outputs of the two are either in phase or 180° out of phase. There is, however, a difference in the voltage at the output of the phase detecting circuit 72 between the two conditions which is sufficient to selectively actuate the indicator 29, here shown as a gaseous discharge device. That is, when the frequency of the microwave oscillator 10 is properly related to the frequency of the selected sideband out of the tunable transmission cavity 17 of FIG. 1, the indicator 29 will glow.

While the foregoing description is sufficient to enable a person of ordinary skill in the art to fabricate a crystal controlled tunable oscillator meeting the objects of the invention, it will be immediately obvious to such a person that the particular embodiment described may be modified or changed in many ways without departing from the concepts of the invention. It is felt, therefore, that the invention should not be restricted by its described embodiment, but rather should be limited only by the spirit and scope of the appended claims.

What is claimed is:

1. Apparatus for producing a spectrum of signals with which to establish the frequency of a tunable microwave oscillator such apparatus comprising:

(a) a crystal-controlled oscillator having a natural frefrequency in the radio frequency range;

(b) means for loading the oscillator to vary the frequency of the output signal of such oscillator from its natural frequency by an amount not exceeding 0.1% of such natural frequency;

(c) means for multiplying the output signal of the crystal-controlled oscillator and producing a first spectrum of signals within the tuning range of said microwave oscillator; and, (d) means for deriving an output signal from the crystal-controlled oscillator and mixing said signal with the individual signals in the first spectrum of signals to produce a second spectrum of signals within said tuning range, the frequency separation between each successive signal in the second spectrum of signals being equal to the frequency of the output signal derived from the crystal-controlled oscillator.

2. Apparatus as claimed in claim 1 including a tunable microwave filter to select from said second spectrum of signals a microwave reference signal whose frequency is predetermined in accordance with a calibration of said filter, means to combine the selected microwave reference signal with the microwave oscillator signal and to produce a resultant I.F. signal whose frequency corresponds to the difference thereof, means to produce an I.F. signal of standard frequency, and means to control the frequency of said microwave oscillator as a function of the phase difference between said I.F. signals.

3. Apparatus as claimed in claim 2 including means to determine the sense of the difference between the frequency of the selected microwave reference signal and the frequency of the microwave oscillator signal.

4. Apparatus as claimed in claim 3 including a frequency meter to provide an indication of the frequency of said crystal oscillator.

References Cited by the Examiner

UNITED STATES PATENTS

| | | | |
|---|---|---|---|
| 2,808,509 | 10/1957 | Felch et al. | 331—19 X |
| 2,860,246 | 11/1958 | Jakubowics | 331—19 |
| 3,064,199 | 11/1962 | Brabham | 331—76 X |

ROY LAKE, *Primary Examiner.*

JOHN KOMINSKI, *Examiner.*